(12) United States Patent
Demos et al.

(10) Patent No.: US 12,135,288 B2
(45) Date of Patent: Nov. 5, 2024

(54) METHODS FOR ULTRAVIOLET EXCITATION MICROSCOPY OF BIOLOGICAL SURFACES

(71) Applicant: UNIVERSITY OF ROCHESTER, Rochester, NY (US)

(72) Inventors: Stavros G. Demos, Pittsford, NY (US); Chi Huang, Foster City, CA (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 18/515,408

(22) Filed: Nov. 21, 2023

(65) Prior Publication Data

US 2024/0085330 A1  Mar. 14, 2024

Related U.S. Application Data

(63) Continuation of application No. 16/964,831, filed as application No. PCT/US2019/015103 on Jan. 25, 2019.

(Continued)

(51) Int. Cl.
*G01N 21/64* (2006.01)
*G01N 1/30* (2006.01)

(52) U.S. Cl.
CPC ........... *G01N 21/6458* (2013.01); *G01N 1/30* (2013.01); *G01N 2001/302* (2013.01)

(58) Field of Classification Search
CPC ...... G01N 1/2813; G01N 1/00; G01N 1/2853; G01N 1/30; G01N 1/28; G01N 21/6458; G01N 21/6456; G01N 21/62; G01N 21/63; G01N 21/64; G01N 21/6408; G01N 21/62428; G01N 21/01; G01N 2021/6463; G01N 2021/646; G01N 2021/0162;

(Continued)

(56) References Cited

FOREIGN PATENT DOCUMENTS

KR        20170055973 A  *  5/2017  ......... G01N 21/6458

* cited by examiner

*Primary Examiner* — Don K Wong
(74) *Attorney, Agent, or Firm* — Kilpatrick Townsend & Stockton LLP

(57) ABSTRACT

Microscopy with Ultraviolet Surface Excitation (MUSE) for use in the classroom to enhance life sciences education and curricula, or for other applications, including without limitation the operating room, other medical environments, research environments, and low resource environments. MUSE's suitability is based on multiple key factors including its simplicity of use, the incorporation of inexpensive hardware including LED illumination, and very basic tissue preparation. The ultraviolet excitation acts as passive optical sectioning confining the generated fluorescence signal to only a few micrometers below the tissue surface thus eliminating the out of focus signals. This facilitates image capture of tissue microstructure and organization from specimens at the intact or sliced surface arising from varying fluorophore concentration within the different cellular compartments. Although just the tissue auto fluorescence maybe used, image quality is enhanced with brief application of nontoxic fluorescent dyes to selectively highlight cellular compartments. Sample preparation is safe, efficient and familiar to students with basic chemistry or biology lab experience. Mixed-dye powders may be used to simplify translation of this method for educational, medical, research, low resource, and other settings.

16 Claims, 10 Drawing Sheets

Related U.S. Application Data

(60) Provisional application No. 62/622,358, filed on Jan. 26, 2018, provisional application No. 62/642,730, filed on Mar. 14, 2018.

(58) Field of Classification Search
CPC ..... G01N 2021/6439; G01N 2001/302; G01N 33/533; G01N 33/582
See application file for complete search history.

METHODS FOR ULTRAVIOLET EXCITATION MICROSCOPY OF BIOLOGICAL SURFACES

RELATED APPLICATIONS

This patent application is a continuation of U.S. non-provisional patent application Ser. No. 16/964,831, filed Jul. 24, 2020 for "Methods for Ultraviolet Excitation Microscopy of Biological Surfaces", which application claims priority to U.S. national phase of International Patent Application No. PCT/US2019/015103, filed Jan. 25, 2019 for "Methods for Ultraviolet Excitation Microscopy of Biological Surfaces", which application claims priority to and the benefit of the filing dates of U.S. provisional patent application Ser. No. 62/622,358, filed Jan. 26, 2018 for "Systems and Methods for Ultraviolet Surface Excitation Microscopy" and U.S. provisional patent application Ser. No. 62/642,730, filed Mar. 14, 2018 for "Systems and Methods for Ultraviolet Surface Excitation Microscopy", the entire contents of all of which are incorporated by this reference.

FEDERAL FUNDING

This invention was made with government support under DE-NA0001944 awarded by the Department of Energy. The government has certain rights in the invention.

RELATED FIELDS

Ultraviolet surface excitation microscopy systems and methods.

BACKGROUND

Wide-field light microscopy is an iconic tool for introducing students to the microstructure of living organisms in biology education. Because of the versatility and low price of the wide-field light microscopes, they are widely adopted in schools across the world [1]. However, light scattering in tissues makes direct imaging of cellular structure impossible as the out of focus signal is much stronger while image contrast between cell compartments is very limited. As a result, in the undergraduate education laboratory setting, viewing biological samples has typically been limited to prepared slides of micron-thick tissue sample or to live samples from onion or cheek scraping [2]. Even the onion skin needs to be cut to thin single cell layers in order to visualize the characteristically large in size cell structures such as the cell membrane and nuclei, which is a nontrivial task for a student to accomplish in education settings. Thus, students often find microscopy experiments frustrating, resulting in a low motivating first hands-on experience to exploring the cellular anatomy [2]. For example, experience with students in community colleges, dedicated to making higher education accessible to a broader spectrum of society than traditional 4-year institutions, suggests that challenges in slide preparation demotivates students who often leave the course, which may set them up for failure in higher level courses [3]. Psychologists believe that the achievement motivation is critical for education; a student who is not confident in his/her ability on a subject would become less interested in the related field [4].

Teaching students using prepared microscope slides and textbook images is less engaging and may not stimulate their interest in the life sciences or confidence in their abilities to pursue a career in related fields. Imaging methods under development, offering optical sectioning and ability to rapidly image tissue microstructure [5-10], are complex and expensive for classroom use.

Other areas could also benefit from better microscopy systems and methods. For example, the time, equipment, specialized personnel, and (often toxic) chemicals typically required to prepare a sample for microscopic examination limit where and when samples can be prepared and examined. In an operating room, for instance, one usually does not have the time or ability to prepare a sample for microscopic examination using traditional sample preparation methodologies. Low resource environments are another example where traditional pathology methodologies are simply not possible, due to lack of equipment, expertise, materials, suitable facilities, and suitable places for disposing of the toxic chemicals and other material requiring careful disposal after use.

Better microscopy systems and methods are needed for the classroom, hospital, low resource environments, biomedical research laboratories, and other settings.

SUMMARY

Here we explore Microscopy with Ultraviolet Surface Excitation (MUSE) [11] for use in a variety of settings. MUSE can produce micrographs of the near surface layer of fresh tissue without the need for tissue processing to ultrathin sections as used in conventional H&E staining. Conventional H&E stained sections are typically 5 to 10 $\mu$m thick. The thickness of the specimens using MUSE can be anything, typically on the order of a few millimeters. Organs of small animals (mice, frogs, etc.) are small, on the order of 1 centimeter or less, and can be divided/cut into to a number of sections to image their interior with MUSE. A description of general MUSE methodologies, focused on its potential implementation in the medical field, have been recently presented elsewhere. In short, the study involved fresh or formalin-fixed tissues that are briefly exposed to fluorescent dyes (such as rhodamine or DAPI) that localize in different cellular compartments and are emitting in the visible spectral range. The specimens are subsequently washed in saline and placed in a wide field microscope with the tissue surface typically flattened under slight pressure on a thin optic that is transparent in the spectra range used for excitation. The excitation is provided by a light-emitting diode (LED) source operating in the ultraviolet (UV) spectral range (in one example, at about 270 nm). This excitation causes ground state electrons of the fluorescent dyes to populate higher excited states and eventually cascade in the lower excited stated to produce the typical visible fluorescence from each dye. Thus, one UV excitation wavelength can be used for two or more dyes that can provide staining of different cell components, typically the cytoplasm and the nuclei.

The imaging system may be based on standard microscope optics and a monochrome or color charge-coupled device (CCD) camera. Because the penetration depth in tissue of the UV light used in MUSE can be very shallow, on the order of one cell diameter depending on the wavelength [11], the signal may be localized within the imaging depth of the microscope's optics when using lower magnification objectives and still provide spatial resolution on the order of 1 $\mu$m or less. Lower magnification standard microscope objectives as well as long working distance objectives also support oblique angle illumination of the tissue that is bypassing the microscope's optics. The images of human tissues produced with this method can resemble conventional histopathology images while image processing can convert the color images into resembling conventional Hematoxylin and Eosin (H&E) images.

MUSE's suitability in the education, operating room, low resource environments, biomedical research laboratories, and other setting arises from its simplicity, as it may rely on inexpensive hardware and may require very limited preparation of the tissue to be imaged. MUSE systems and methods can be made further suitable for these applications by, for example, using only non-toxic chemicals that meet classroom and other general-use safety requirements, and using tissue preparation processes that can be readily performed by students or other individuals without specialized sample preparation training. For classroom uses, it is generally desirable that the method be useable with tissue specimens commonly used in high school and undergraduate education, that it be implementable in a timely manner (for example within a class period) while multiple students can share resources, and that the acquired images and structural features observed be perceptible and identifiable using information available to the student (books etc.).

In the educational setting, animal dissection remains a vital part of life-science education, because its ability to demonstrate organisms' complexity [12]. Student often only study major organ structures, and dispose the specimens without observation for histology [1]. MUSE can utilize specimens from current dissection sessions to visualize the organ-specific micro structure. This will extend the student learning experience and be more engaging and relevant to students' personal experience compared to cold stock prepared slides. Classroom activities that encourage students to connect course materials to personal experiences increase student motivation and learning, especially for students who have low expectations of success [13]. Furthermore, MUSE can provide a high-quality hands-on experience that can positively affect students' interests as they are studying by inquiry [14]. MUSE will also help improve the animal specimen efficiencies by providing more information from animal specimens and thus meet the 3-R (Replacement, Reduction, and Refinement) principle for experimental animal use [15].

In one example, a microscopy method utilizes an ultraviolet surface excitation microscopy system in combination with a mixed fluorescence dye solution made from a set of fluorescing stains in preselected proportions for generating the mixed fluorescence dye solution when dissolved in a preselected volume of a solvent, the method includes: (a) exposing a sample for microscopic analysis to the mixed fluorescence dye solution for a predetermined time period to stain features of the sample, the solution including at least a first fluorescing stain at a first concentration and a second fluorescing stain at a second concentration, the first fluorescing stain characterized by a first light emission spectrum when subjected to an ultraviolet light of a first wavelength of the microscopy system, the second fluorescence dye characterized by a second light emission spectrum when subjected to the ultraviolet light of the first wavelength of the microscopy system, the first emission spectrum being different from the second emission spectrum; (b) positioning the sample for imaging by the microscope, the microscope including an ultraviolet light source and a microscope objective; (c) using the ultraviolet light source to simultaneously excite the first and second fluorescing stains associated with the features of the sample such that the microscope objective collects light emissions from the first and second fluorescing stains; and (d) the method being configured so that the light emissions of features associated with the first fluorescing stain are imaged by the system at a first intensity and the light emissions of features associated with the second fluorescing stain are imaged by the system at a second intensity, the first and second intensities being approximately the same.

The method may use a multi-channel sensor to detect the light emissions collected by the microscope objective, a first channel of the multi-channel sensor being more sensitive to the first light emission spectrum than the second light emission spectrum, a second channel of the multi-channel sensor being more sensitive to the second light emission spectrum than the first light emission spectrum.

The method may alternatively use commercially available sensors or other sensors, and is not limited to the multi-channel sensors described above.

The method may use a solvent that is a water based fluid.

The first and second intensities being approximately the same may constitute an average of the intensities of the light emissions of features associated with the first fluorescing stain being within a range of ⅓ to 3 times an average of the intensities of the light emissions of features associated with the second fluorescing stain.

The first and second stain concentrations and the predetermined time period may be configured so that the first light emission intensities as recorded by the first channel of the multi-channel sensor and second light emission intensities as recorded by the second channel of the multi-channel sensor are approximately the same.

The first and second stain concentrations, the predetermined time period, and the ultraviolet light source wavelength and intensity may be configured so that the first light emission intensities as recorded by the first channel of the multi-channel sensor and second light emission intensities as recorded by the second channel of the multi-channel sensor are approximately the same.

The first and second stain concentrations, the predetermined time period, and a wavelength emission spectrum of the ultraviolet light source may be configured so that the first light emission intensities as recorded by the first channel of the multi-channel sensor and second light emission intensities as recorded by the second channel of the multi-channel sensor are approximately the same.

The microscopy system may also include at least one filter configured to selectively filter at least a portion of at least one of the first and second light emission spectrums so that the first light emission intensities as recorded by the first channel of the multi-channel sensor and second light emission intensities as recorded by the second channel of the multi-channel sensor are approximately the same.

The first and second stain concentrations, the predetermined time period, the ultraviolet light source, and the at least one filter may be configured so that the first light emission intensities as recorded by the first channel of the multi-channel sensor and second light emission intensities as recorded by the second channel of the multi-channel sensor are approximately the same.

The at least one filter may be configured to attenuate at least one of a red, green, or blue spectral range, the multi-channel sensor having three channels covering red, green, or blue spectral ranges.

The ultraviolet surface excitation microscopy system may include an image processor, the image processor being configured to generate an image such that the light emissions of the first and second fluorescence dye are imaged with the first and second intensities being approximately the same.

The set of fluorescing stains in preselected proportions may be in a powder form and stain different cellular compartments.

The set of fluorescing stains in preselected proportions may be a powder form of a Eosin dye and a powder form of a Hoechst dye in which an amount of the Eosin dye is in a range of approximately one to ten times an amount of the Hoechst dye by weight.

Using the ultraviolet light source to simultaneously excite the first and second fluorescing stains associated with features of the sample may constitute exposing the first and second fluorescing stains associated with features of the sample to ultraviolet light in the range of 230 nm to 370 nm.

Using the ultraviolet light source to simultaneously excite the first and second fluorescing stains associated with features of the sample may constitute exposing the first and second fluorescing stains associated with features of the sample to ultraviolet light in the range of 250 nm to 290 nm.

Using the ultraviolet light source to simultaneously excite the first and second fluorescing stains associated with features of the sample may constitute exposing the first and second fluorescing stains associated with features of the sample to ultraviolet light in the range of 270 nm to 280 nm.

Using the ultraviolet light source to simultaneously excite the first and second fluorescing stains associated with features of the sample may constitute exposing the first and second fluorescing stains associated with features of the sample to ultraviolet light in the range of 260 nm to 280 nm.

In another example, a microscopy method utilizes an ultraviolet surface excitation microscopy system in combination with a mixed fluorescence dye solution made from a set of fluorescing stains in preselected proportions for generating the mixed fluorescence dye solution when resolved in a preselected volume of solvent, the method includes: (a) exposing a sample for microscopic analysis to the mixed fluorescence dye solution for a predetermined time period to stain features of the sample, the solution including at least a first fluorescing stain at a first concentration and a second fluorescing stain at a second concentration, the first fluorescing stain characterized by a first light emission spectrum when subjected to an ultraviolet light of a first wavelength of the microscopy system, the second fluorescence dye characterized by a second light emission spectrum when subjected to the ultraviolet light of the first wavelength of the microscopy system, the first emission spectrum being different from the second emission spectrum; (b) positioning the sample for imaging by the microscope, the microscope including an ultraviolet light source and a microscope objective; and (c) using the ultraviolet light source to simultaneously excite the first and second fluorescing stains associated with the features of the sample such that the microscope objective collects light emissions from the first and second fluorescing stains.

The mixed fluorescence dye solution may be made from a pre-selected amount of the first fluorescing stain and a pre-selected amount of the second fluorescing stain, the first and second fluorescing stains being in powder, solid, or liquid form prior to being dissolved in the solvent.

Prior to being dissolved in the solvent, the pre-selected amount of the first fluorescing stain and the pre-selected amount of the second fluorescing stain may be contained in one or more tablets or one or more capsules.

Prior to being dissolved in the solvent, the pre-selected amount of the first fluorescing stain and the pre-selected amount of the second fluorescing stain may be contained in a single tablet or capsule.

Prior to being dissolved in the solvent, the pre-selected amount of the first fluorescing stain and the preselected amount of the second fluorescing stain may be in liquid form and contained in a container.

Exposing the sample to the mixed fluorescence dye solution may be part of a staining procedure that includes exposing the sample to an alcohol-based liquid.

Exposing the sample to the mixed fluorescence dye solution may be part of a staining procedure that further comprises exposing the sample to a substance that facilitates increase of the uptake of the dye solution into the tissue.

Exposing the sample to the mixed fluorescence dye solution may be part of a staining procedure including a plurality of steps in which the sample is exposed to a plurality of fluids for pre-determined time periods, a total time of the pre-determined time periods of the plurality of steps may be less than 5 minutes.

Exposing the sample to the mixed fluorescence dye solution may be part of a staining procedure that includes a plurality of steps in which the sample is exposed to a plurality of fluids for pre-determined time periods, a total time of the pre-determined time periods of the plurality of steps may be less than 3 minutes.

The sample may have a thickness of over 0.05 mm.

Exposing the sample to the fluorescent dye solution may constitute exposing the sample to a dye solution including an Eosin dye and a Hoechst dye, a concentration of the Eosin dye being approximately one to ten times a concentration of the Hoechst dye.

Exposing the sample to the fluorescent dye solution may constitute exposing the sample to a dye solution including an Eosin dye and a Hoechst dye, a concentration of the Eosin dye may be approximately four times a concentration of the Hoechst dye.

Exposing the sample to the fluorescent dye solution may constitute exposing the sample to a dye solution including approximately 1-3 mg/ml of Eosin and approximately 250-750 µg/ml of Hoechst for 30 seconds-2 minutes.

The ultraviolet light source may be a 275 nm ultraviolet light source with a light density of 1 to 600 milliWatts per square centimeter.

DETAILED DESCRIPTION

The following detailed description provides illustrative, non-limiting, examples of MUSE systems and methods, and do not limit the scope of the inventions claimed by this patent.

Figure 1:
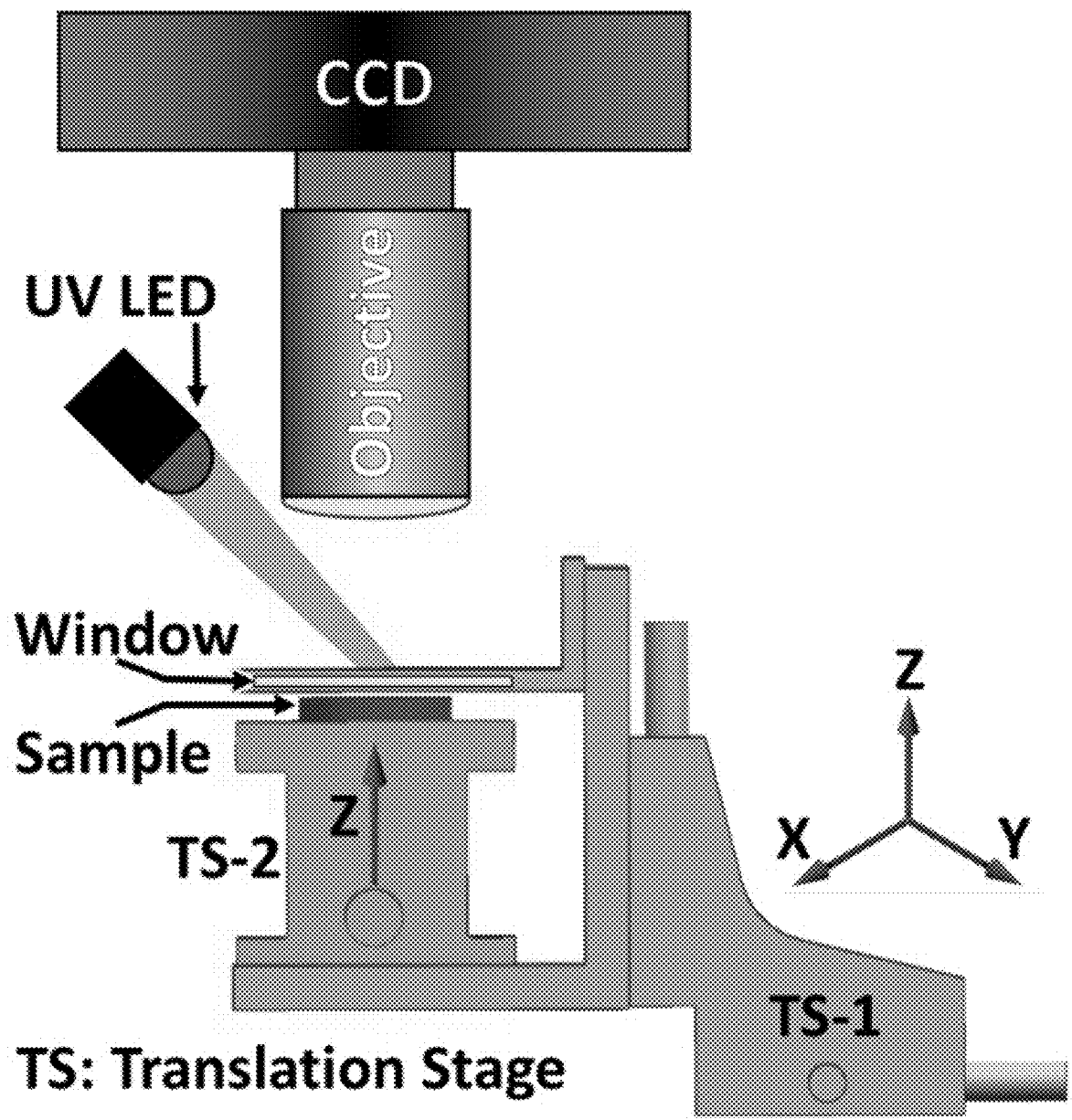
FIG. 1 schematically illustrates an example of a MUSE microscope setup.

FIG. 1 shows one example of a MUSE microscope. The microscope includes an ultraviolet light source, which, in this example, is a UV LED, although, in other instances, other types of UV light sources may be used (e.g. multiple LED's, lasers (fixed or tunable), arc lamps, plasma lamps, etc.). As one example, the light source may be a 270 nm UV LED (Ocean Optics), having a light output of about 600 µW with its output focused into an area of about 4 mm$^2$ using a ball lens attached to the LED. In this example, there is an estimated power density of about 10 mW/cm$^2$. Light sources of other or additional wavelengths may be employed, such as in spectral ranges between 290 and 240 nm, or between 290 and 360 nm, or between 230 and 370 nm.

As shown in FIG. 1, light is directed to the sample at an oblique angle. As also shown in FIG. 1, the sample may be positioned under and in contact with a transparent window, which may function to slightly flatten the surface of the sample for imaging. A CCD camera captures an image of the sample via the microscope's objective. In other embodiments, a CMOS or other digital or analog camera may be utilized. In still other embodiments, the image may be directly visualized using an eyepiece, rather than a camera.

Although not shown in FIG. 1, one or more optical filters may be incorporated into the microscope for selectively attenuating certain spectral ranges (e.g. the red, green, or blue part of the spectrum), for reasons that will be discussed in further detail below. Other types of filters could also be incorporated, such as polarization filters. The filter(s) may be incorporated into the system between the objective and the CCD, or in other locations.

1. AUTO-FLUORESCENCE IMAGING

Figure 2:
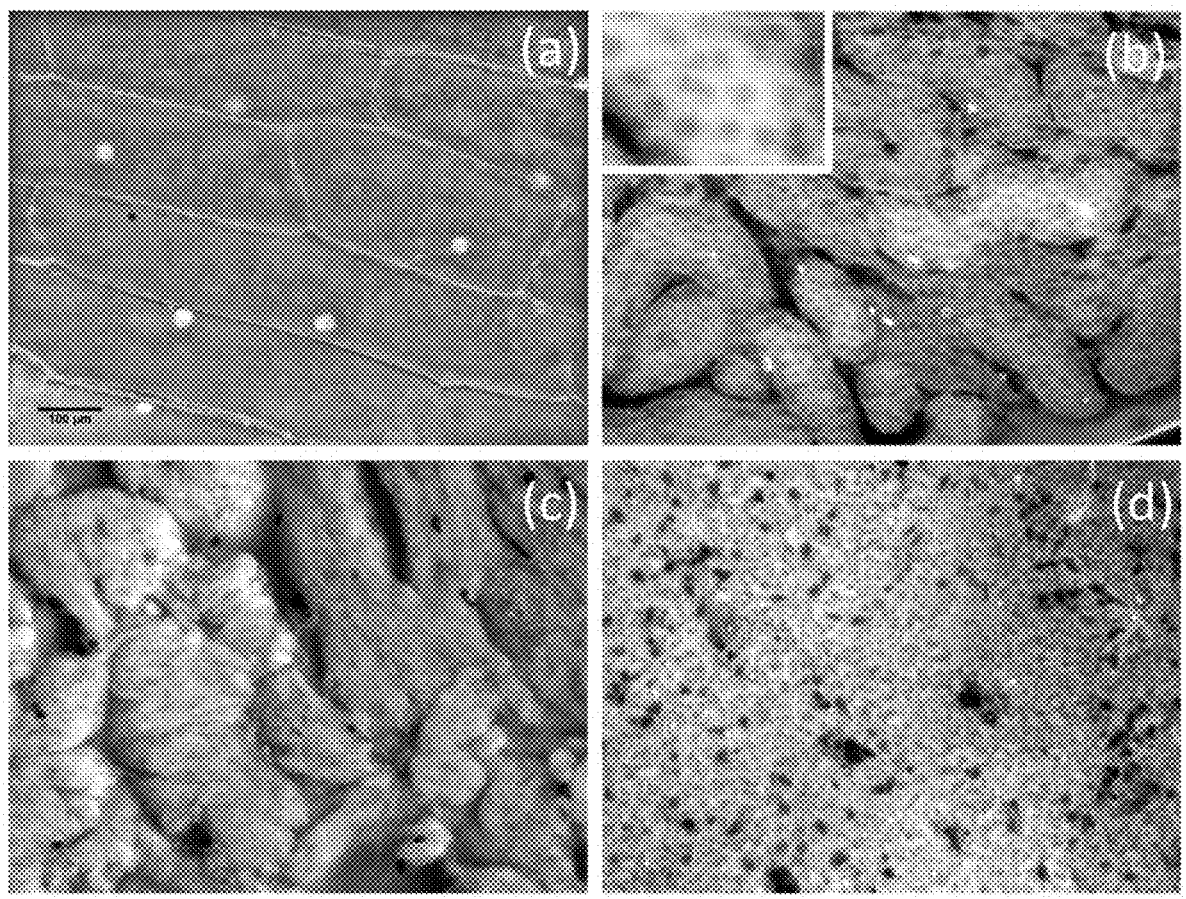
FIG. 2 shows examples of images obtained with MUSE autofluorescence: a) Fresh white onion tissue, b) Fresh frog kidney tissue, c) fresh frog cardiac muscle tissue, d) frog liver tissue.

In one experiment, the LED light output of the MUSE microscope shown in FIG. 1 was sufficient to capture auto fluorescence microscopic images of fresh tissues without any preparation or staining, using exposure times on the order of a few seconds. FIG. 2 shows exemplary images from the surface of tissue sections having a thickness on the order of 5 mm. Specifically, FIG. 2(a) show an image of thin sections of onion tissue capturing the structure of the onion cells and their nuclei. In contrast to the laborious effort to image thin section of onion under white light microscopy, imaging with MUSE was very simple, no longer than about the 1-minute interval required to cut a 5 mm section of the onion tissue and place in the MUSE microscope. The images of the onion cells were readily available showing the nuclei and membranes as features of higher intensity.

Images shown in FIGS. 2(b), 2(c) and 2(d) are from frog kidney, heart and liver, respectively. The image shown in FIG. 2(b) captures the structure of the tubules as observed through the kidney membrane. The inset in FIG. 2(b) shows a higher magnification section of a single tubule showing that the cell nuclei appear as features of lower intensity. Similar images were previously reported using laser excitation sources [16-17]. The demonstration of such imaging using simple, inexpensive and much safer LED sources is critical for the translation of this technology in the educational setting. The images of cardiac and liver tissues shown in FIGS. 2(c) and 2(d) demonstrate the ability of MUSE autofluorescnece imaging to visualize the different microstructure of various organs in an interactive manner and in real time, providing a capability that is currently not available in the educational setting. Note that the dark features, on the order of 10 µm in diameter, observed in FIG. 2(c) are blood cells. Blood cells are also visible in the image of FIG. 2(d) where additional larger dark features are related to the vascular structure of the tissue.

2. IMAGING OF STAINED SAMPLES

A wide variety of non-toxic fluorescence dyes were tested including DAPI, Hoechst 33342, and Propidium Iodide for highlighting nuclei, and Eosin Y, and Fluorescein for counterstaining cytoplasm. Nucleus fluorescence dyes were tested over a wide range of concentrations in deionized water. Cytoplasm counterstaining dyes were also tested.

Figure 8:
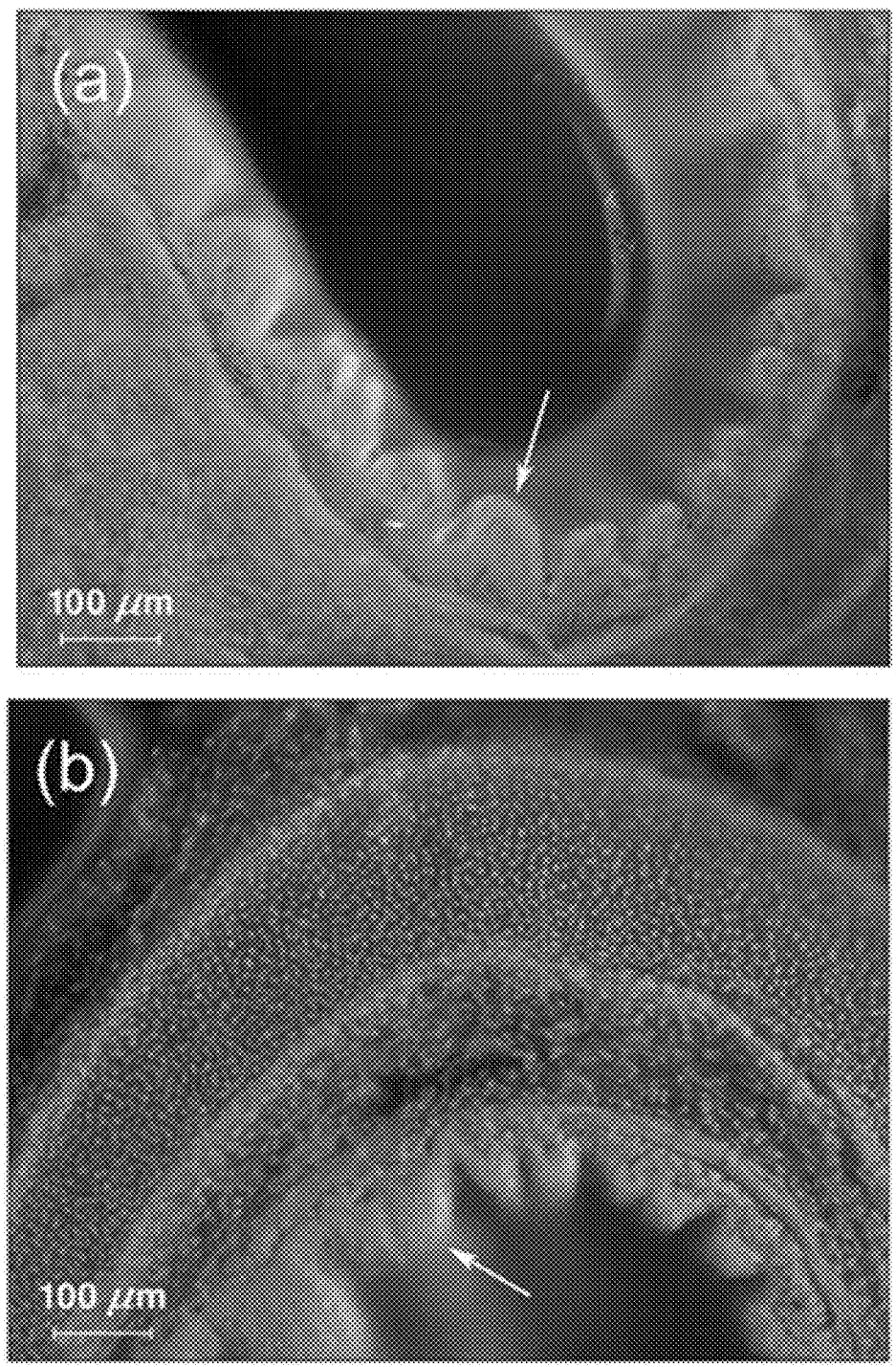
FIG. 8 shows examples of MUSE images of preserved porcine bronchi unstained (FIG. 8(a)) and after brief immersion in aqueous solution of Hoechst 33342 (FIG. 8(b)).

FIG. 8(a) shows a MUSE auto-fluorescence image of preserved pig lung. FIG. 8(b) shows a MUSE image of a similar location following immersion in 500 µg/ml Hoechst 33342 for 15 seconds to enhance the prominence of cell nuclei. Although autofluorescence imaging demonstrated the folded epithelial layer (arrow) and underlying smooth muscle, nuclear staining yielded additional detail and enable visualization of what appears to be cartilage plate.

Samples were submerged into stain solution to facilitate uniform staining across the surface. The monochrome camera used in the previous sections (for autofluorescence imaging) was replaced by a color CCD camera to evaluate the imaging quality of individual and combined fluorescing stains. Stains were selected that were nontoxic and suitable for use in a classroom environment. In some implementations, water soluble stains may be desirable. In addition, the emission spectra range of each dye, when simultaneously applied to a tissue, were chosen to be different. Tissues were sequentially submerged for various exposure times to individual dye solutions with the parameters involved (dye concentration and exposure time) varied to optimize image quality.

To analyze the image information arising from the emission of each dye (stain) in the fluorescence image, the emission spectrum of each dye must be different. For example, DAPI and Hoechst 33342 can stain the nucleus and they are both emitting in the blue spectral region. Eosin Y and Fluorescein can stain the cytoplasm and they are emitting in the yellow and red spectral region. The color CCD detector captures the different generated colors allowing for visualization of the localization of each contrast agent.

Figure 3:
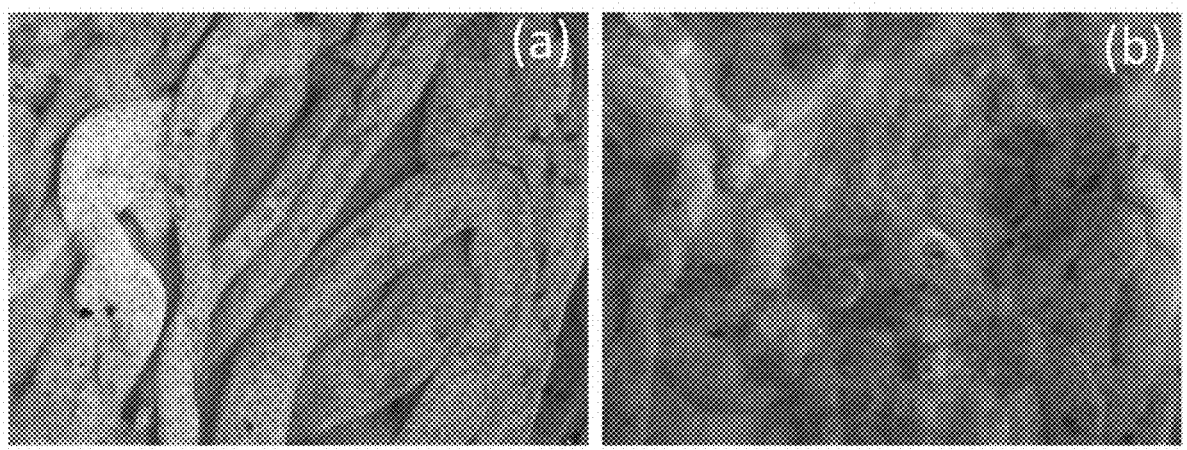
FIG. 3 shows examples of MUSE images of fresh frog kidney tissue stained with Eosin Y: a) undertrained, b) overstained.

Our work has revealed important parameters enabling the use of MUSE microscopy in an educational setting and other settings, including without limitation an operating room, biomedical research laboratories, and low-resource environments. Specifically, the concentration of each dye needs to be within certain range. Lower concentration will not stain the tissue efficiently for MUSE imaging. Higher concentration will result in over staining the tissue which in turn results in low quality imaging of the intended structure or complete loss of the ability to image these structures using MUSE. The exposure time of the tissue into the stain also needs to be within a certain time window, with some dependence on the dye concentration. Longer exposure will result in over staining the tissue while shorter exposure will result in insufficient staining leading to localized and/or partial staining of certain sections of the tissue or to a depth that is less than about one cell layer for imaging with MUSE. Such effect is demonstrated in the images of frog tissue stained with Eosin Y shown in FIG. 3. Specifically, the images in FIG. 3(a) is an under-stained tissue where the blueish autofluorescence signal is in parity with the yellowish signal produced by the stain. In contrast, the image shown in FIG. 3(b) is over-stained resulting in non-uniform staining and images artifacts.

Figure 4:
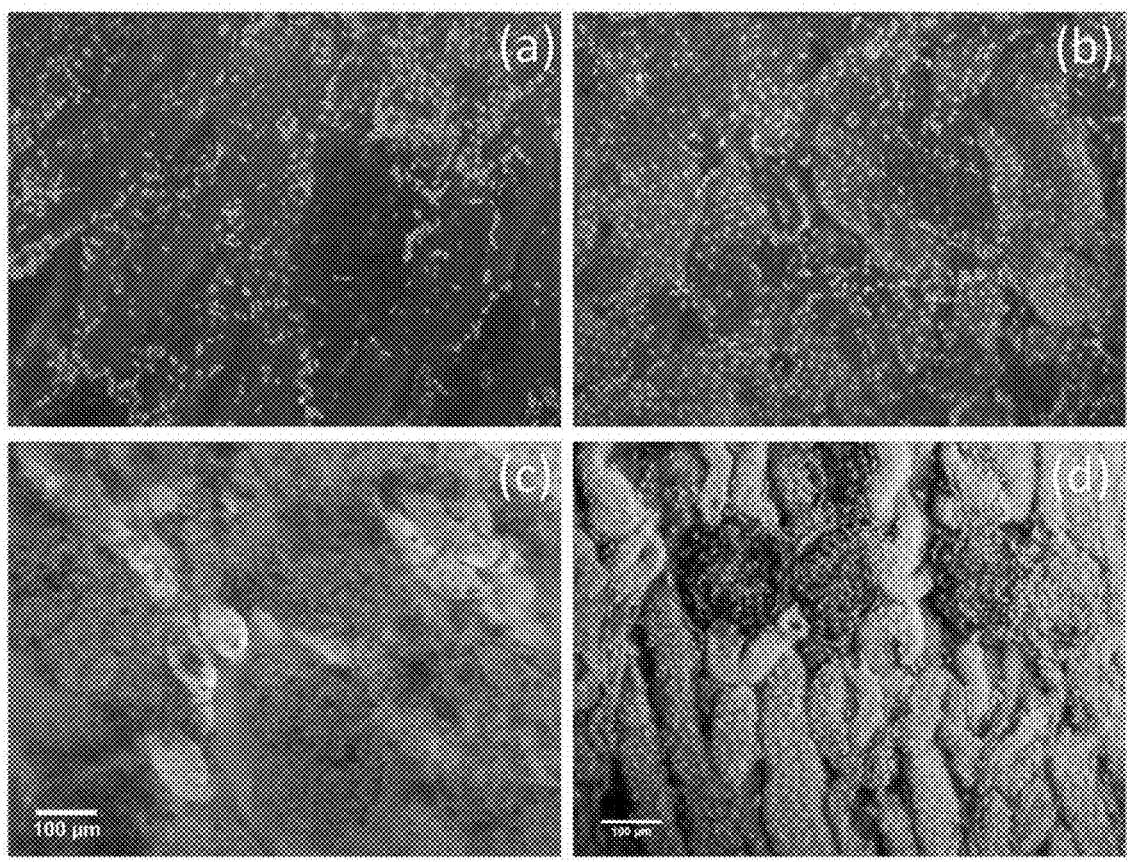
FIG. 4 shows examples of MUSE images of frog kidney tissue using different stains: a), Propidium Iodide b) Hoechst 33342, c) Eosin Y, d) Hoechst 33342 plus Eosin Y.

FIG. 4 demonstrates characteristic examples of staining frog kidney tissue with different dyes. Specifically, FIGS. 4(a) and 4(b) show images after exposure to Propidium Iodide (500 μg/ml for 15 seconds) and Hoechst 33342 (500 μg/ml for 15 seconds) to highlight the nuclei which appear with red and blue color, respectively. The cytoplasm is barely visible, possibly only from the (blue) autofluorescence emission. The image in FIG. 4(c) was obtained following staining of the cytoplasm with Eosin Y. The stain exposed the rest of the cells but not the nuclei, which can still be visualized as darker features. The image in FIG. 4(d) was obtained following successive exposure to Eosin Y (5 mg/ml in water for 40 seconds) and Hoechst 33342 (500 ug/ml in water for 40 seconds) which enables simultaneous visualization of the cytoplasm and the nuclei with different color (yellow and blue respectively). The microstructure of the kidney tissue including the glomerulus and tubules along with the associated cell nuclei can be readily appreciated. The sample preparation was rapid (entire process of tissue cutting and staining was less than 5 minutes) and efficient utilizing non-hazardous, classroom-compatible chemicals.

3. EMISSION INTENSITY AND DIGITAL IMAGE PROCESSING

The simultaneously acquisition of the fluorescence of different stains using a color digital camera separates the generated fluorescence into different spectral components (red, green and blue) and simultaneously records each component. The number of bits used to represent each of the color channels (Red, Green, Blue) is typically 8, which represent the numeric values (ranging from 0 to 256) of the intensity of each color pixel of the image. In at least some implementations, in the context of using such color sensor to acquire MUSE images, the intensity of the emission generated by each dye should be approximately the same.

"Approximately the same" emission intensity should be understood to include values between ⅓ and 3 times of an average value (a range of factor of 4) when considering a camera with dynamic range of 8 bits per image/color channel. For example, this can be between 60 and 256 count per pixel as can be measured using a digital image analysis platform. Using as a specific example the image shown in in FIG. 4(d), the pixels containing the blue-colored nuclei have an intensity between approximately 100 and 255 counts in the blue image channel. The image pixels that appear with yellow color (mix of green and red color) have an intensity in the green and red channels that is about 150 counts on average with maximum and minimum values between 100 and 256 counts. This provides a color image where both the blue emission of the nuclei (due to staining by Hoechst 33342) and the yellow emission (of the eosin) from the cytoplasm can be visualized. An imbalance between the two would make visualization of the lower intensity component very difficult, thus not practical for an educational setting. Higher dynamic range cameras can utilize accordingly a higher range of emission intensities that can be considered as "Approximately the same," such as by extending the range of intensity values by a factor of 2 for each additional bit of dynamic range. The above discussion refers to the displayed image intensity. This can be different from the recorded by the sensor intensity which can be digitally processed to enhance certain components before displayed to the user.

One way of achieving approximately the same image intensity is by controlling the concentration of each stain in the tissue (relating to the concentration of each dye solution and the exposure time of the tissue in the solution or solutions). There are other methods to address such issues that are contemplated and within the scope of the present disclosure, such as using appropriate color filter to reject (partially or totally) part of the spectrum.

Figure 5:
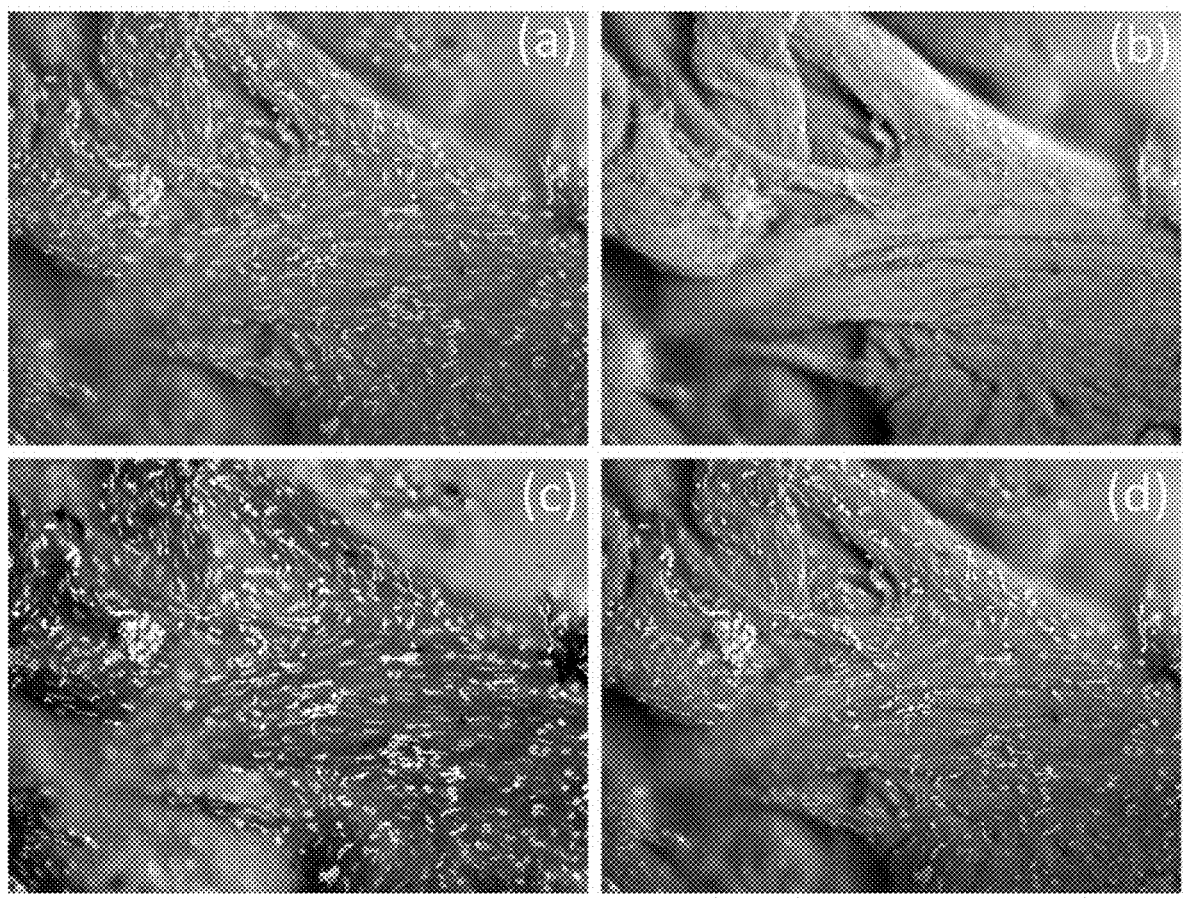
FIG. 5 shows example images of: a) fresh frog cardiac muscle tissue under staining with Hoechst 33342 and Eosin Y. Digitally processed images using the original blue, green and red image components of the RGB color image to separate out the emission components of b) Eosin Y and c) Hoechst 33342. d) Color enhanced digitally processed to improve the image quality.

The digital color image can be further separated into its constituent components (blue, green and red). In the example of the image of cardiac tissue (exposed to 2 mg/ml Eosin+500 μg/ml Hoechst for 1 min) shown in FIG. 5(a), the signal from the nuclei is recorded mainly in the blue and the green channels and the signal from the cytoplasm in the green and red channels. One can then use a number of different methods to separate the two signal components. This is demonstrated in the images shown in FIGS. 5(b) and 5(c) where the image component of the Eosin and Hoechst are separated, respectively. Furthermore, the images can be recombined to form new images with tailored color designation, as shown in the image of FIG. 5(d).

Figure 6:
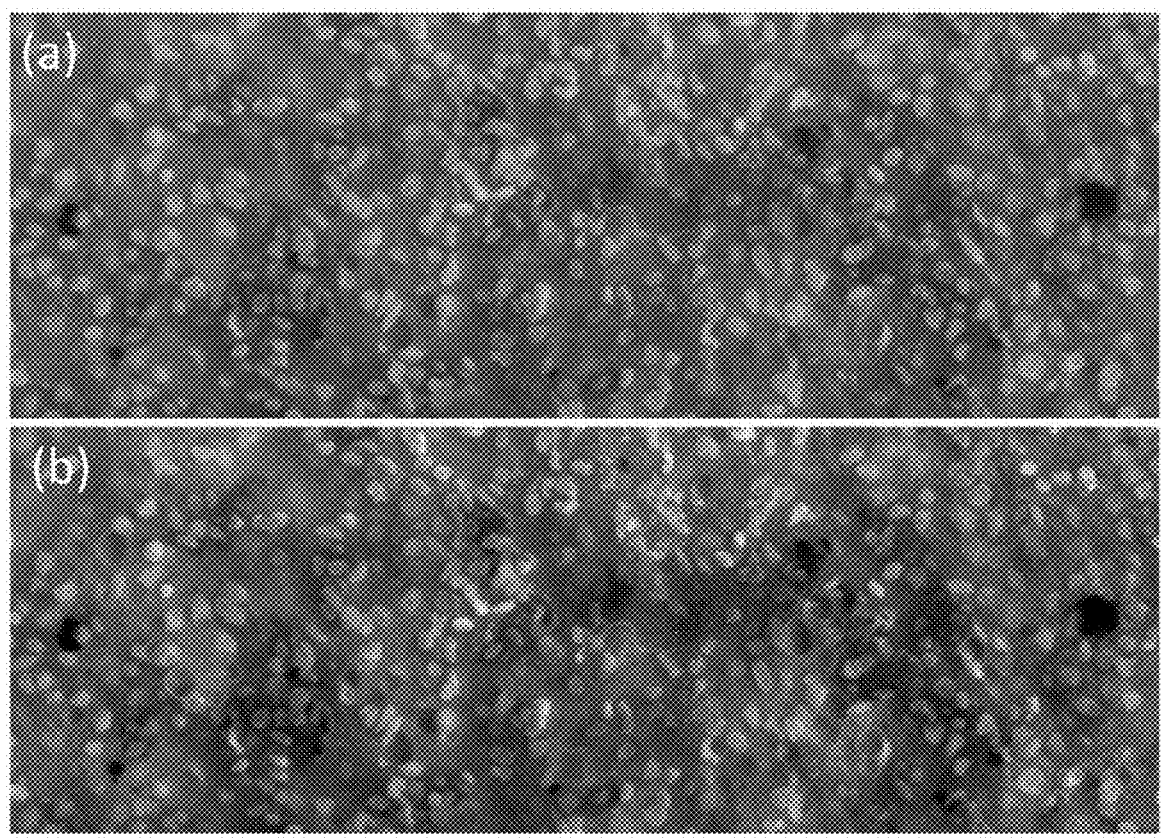
FIG. 6 shows examples of: a) MUSE image of fresh frog liver tissue under staining with Hoechst 33342 and Eosin Y. b) Digitally processed image where the blue image is replaced with the green image to enhance image quality.

Digital image processing can be used to enhance the image quality and visualization of features. This is demonstrated in the images shown in FIG. 6. The original MUSE image of a frog liver section is shown in FIG. 6(a). Splitting this image in to the constituent images demonstrate that the intensity of the nuclei at the blue image is saturated, causing a degradation of the overall image. On the other hand, the red image is underexposed. Digitally increasing the intensity of the red image and replacing the blue image with the green image, a pseudo color image is reconstructed in FIG. 6(b) that can be considered as providing a more detailed and clear visualization of the tissue microstructure.

4. MIXED FLUORESCENT STAIN EVALUATION

In the life sciences educational setting, the focus is the understanding of the cellular structure and organization of fresh or preserved tissue samples rather than the chemistry and associated labor (and time effort) of mixing contrast agents and exposing the tissue. Similar concerns are also present in operating room and other medical and research environments (where time constraints, safety procedures preventing use of toxic chemicals, and other constraints making traditional sample preparation techniques impractical if not impossible), low resource environments (where there simply may be a lack of the specialized equipment, materials, expertise, and suitable locations necessary for traditional sample preparation techniques), and other settings. It is therefore desirable to devise a rapid and simple method to prepare the contrast agents solution. A possible solution to this issue is the formulation of mix dyes, such as in powder form, that can be fabricated in a small tablet form or contained within a capsule such as a water-soluble capsule. This can then be simply placed in a flask containing distilled water or Phosphate-buffered saline or a different suitable medium to rapidly and safely prepare a solution of a mixed dye for staining tissue for MUSE imaging. When considering such combination of mixed dyes, the exposure time of the tissue to each dye would be the same. This requires the development of a well-controlled ratio and concentration of dyes within the liquid solution so that all intended structures of interest (typically the nucleus and the cytoplasm) are properly imaged. This includes a) an image intensity per pixel that is typically higher than about 50 counts (but it can be lower), b) good staining of the cellular compartment so that the generated emission is higher by at least a factor of 1.2 with respect to the tissue auto-fluorescence, c) the tissue is not overstained, which can cause image artifacts, and d) the recorded emission intensity in the corresponding features of interest (typically the cytoplasm and the nuclei) on the image components (which can be separated by the RGB image channels) arising from each dye is about the same (as defined in paragraph 67). It must also be recognized that the relative concentration of each dye to achieve the above criteria can be (and typically is) a function of the excitation wavelength.

Figure 7:
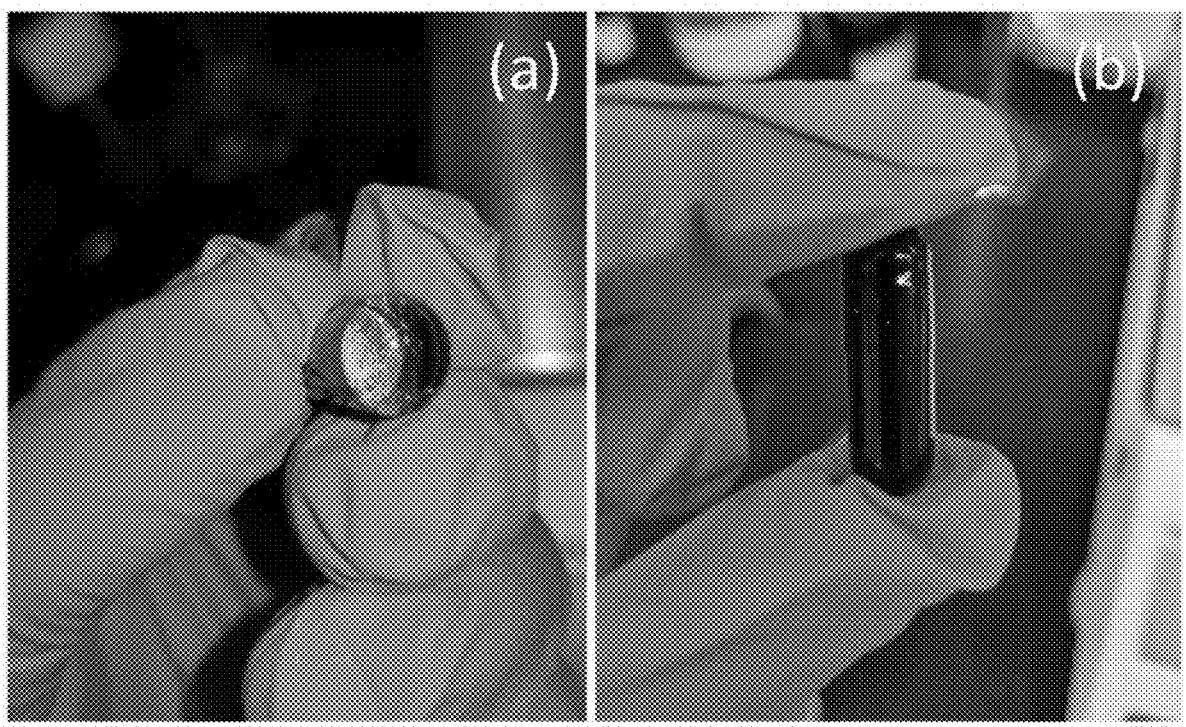
FIG. 7 shows an example of predetermined quantities of dye powders placed in a gelatin capsule for storage. This powder mix is stable and can be dissolved in 100 ml deionized water to produce sufficient dye solution for all students in a classroom session.

To test this concept, we utilized Eosin Y and Hoechst, mixed together in powder form and stored in a water-soluble gelatin capsule size 00 (0.9 mL). FIG. 7 shows photographs of the gelatin capsule containing the mixed powder of Eosin Y and Hoechst. Through experimentation we developed a mixture containing 200 mg Eosin and 50 mg Hoechst (in powder form) that can be used to make 100 ml of solution, which we consider to be sufficient to meet the needs of all students within a laboratory session. In order to prepare the solution, the capsule is opened and the powder is dissolved (via stirring for about 1 minute) into 100 ml deionized water. The tissue samples were subsequently immersed for about 60 seconds into the mixed-stain solution to facilitate uniform staining across the surface of the tissue section. We found that this powder mixture within the gelatin capsule is stable and yields images that are practically identical to those shown in FIGS. 2-6 using separate dye solutions. In some instances, it may be desirable to include additives in the mixture, such as additives for controlling parameters of the solution such as acidity (pH). Such additives can enhance the permeability of the stain to the tissue or provide other desirable effects (enhance or reduce quantum efficiency of emission, modify emission spectrum, etc.). This approach makes the use of the MUSE imaging simple and less expensive in a classroom setting (as the solution is prepared once, maybe by the instructor) and is also more time efficient (imaging of tissue specimen can start within a few minutes).

Experimentation also indicated that, in fresh tissue specimens, a brief exposure to isopropanol enhances the staining of the nuclei. In this case, the whole procedure (10 sec PBS rinse, 20 sec in isopropanol, 10 sec PBS rinse, 60 seconds in stain solution, 10 sec rinse) from harvesting the tissue sample to obtain the image takes less than 3 minutes. Due to the short procedure, the students should be able to study more than 5 different tissues in one and half hour lab session.

5. IMAGING FORMAT CONSIDERATIONS

Figure 9:
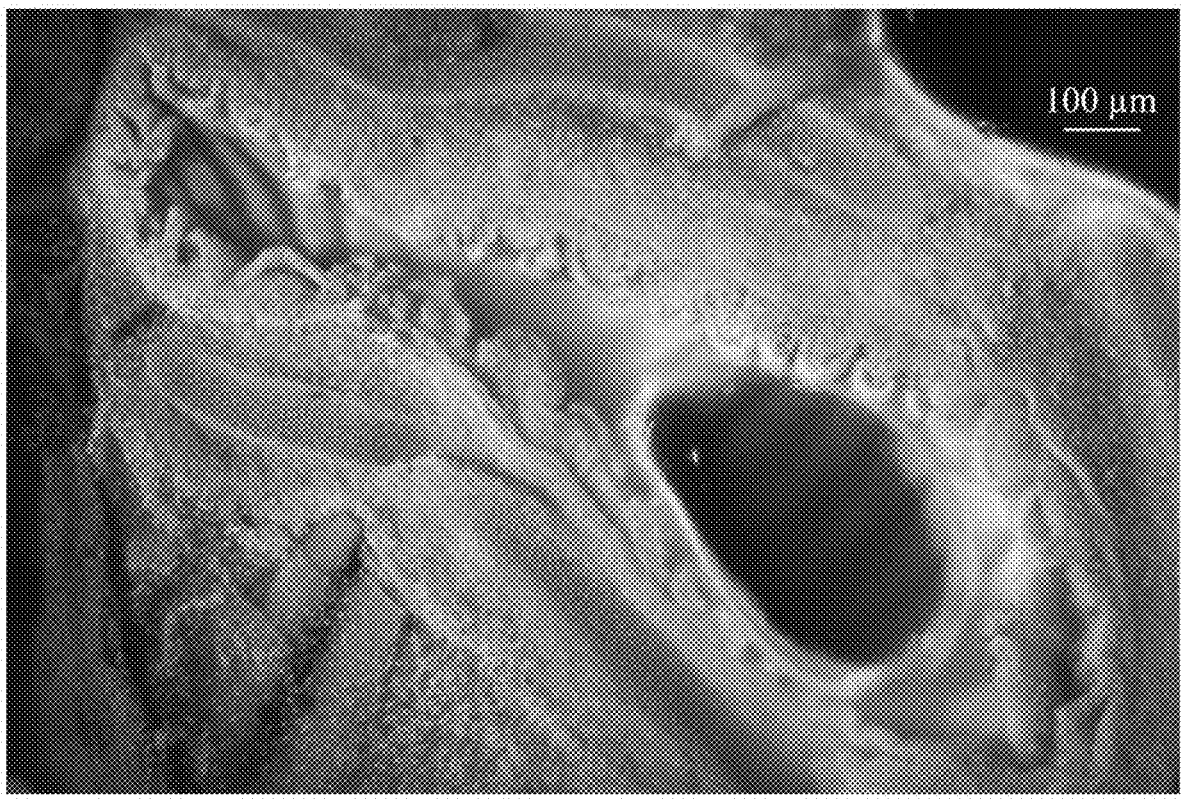
FIG. 9 shows an example of a MUSE image of preserved pig bronchial tissue using a 4× magnification microscope objective.

FIG. 9 shows a MUSE image of preserved fetal porcine bronchial tissue providing a dramatic example of tissue structure at lower spatial resolution using a 4× International Standard Microscope objectives in combination with a color CMOS camera with 2.4 µm pixel size.

Figure 10:
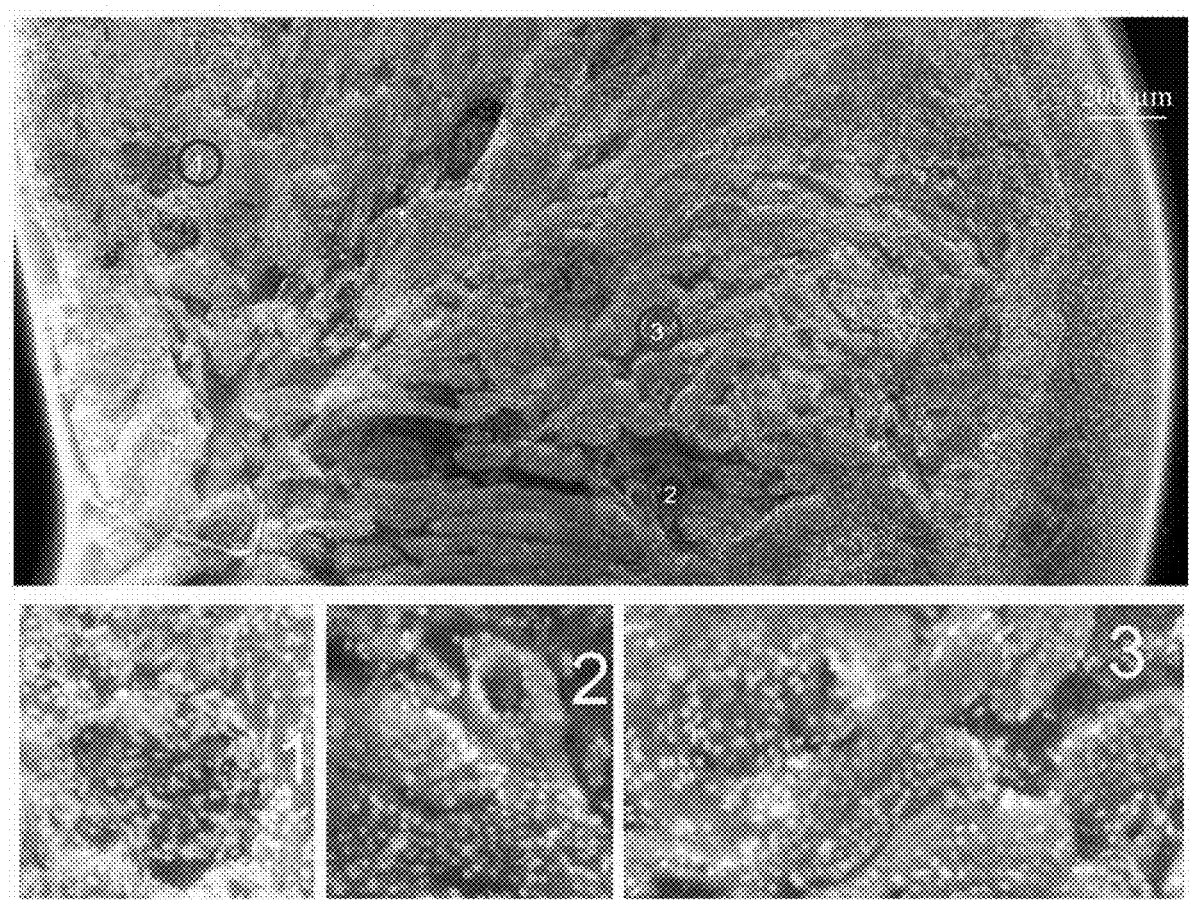
FIG. 10 shows an example of a stitched wide field image of ranine kidney. Insets 1-3 are 3× magnified portions of the stitched image at numbered locations.

While providing a larger field of view is often beneficial, it is also often desirable to maintain high-resolution detail. The tradeoff between providing a large field of view and maintaining adequate spatial resolution can be negated by employing digital stitching. This is demonstrated in FIG. 10 where a cross section of frog kidney is shown obtained by digitally stitching (using Adobe Photoshop) 5 individual images acquired with a 4× microscope objective to create a large image that provides high resolution throughout the image field. The magnified images indicated good visualization of nuclei organization using the 4× objective.

As mentioned above, various cameras incorporating different CCD and CMOS sensors were tested as part of this work. These cameras are commercially available and are relatively inexpensive representing current generation products. In general, all camera performed adequately. Smaller pixels support lower loss of optical resolution due to digital image acquisition. Active camera cooling provides a higher signal to noise ratio, which is also highly dependent on the sensor quality.

6. CONCLUSION

Life sciences and biotechnology are widely expected to be the next wave of the knowledge based economy. Creating the required workforce and fostering the individual talent in the related fields is of fundamental importance in developing frontier technologies in life sciences. The development of optical technologies for medical and biomedical application has been steadily growing. The creation of the next generation talent starts form the early years in school where the emphasis must be focused. MUSE imaging provides a novel tool to enhance education of life sciences by providing information-rich images of tissue microstructure with minimal difficulty and required skills by the student. These same techniques can also be used to beneficial effect in hospital, low resource, biomedical research laboratories, and other environments. Sample preparation is safe, efficient, does not require toxic chemicals, and is performable by persons without specialized expertise or training. When desired, image contrast and information can be enhanced using nontoxic fluorescent dyes to selectively highlight cellular compartments. In the educational environment, MUSE-based labs will not only enhance life science curricula but also can provide cross-disciplinary experiences in STEM education, i.e. in conjunction with physics, chemistry and computer science curricula. Student can collect their "own" images and use the textbook to identify the structures they observe. As images are provided in real time, the method also enables the student to search and identify the structures of specific interest in the classroom. Beyond educational contexts, MUSE is also useful in clinical, research, medical, and low resource settings that can require high volume, low cost, and rapid tissue evaluation without requiring the use of toxic chemicals or expensive equipment.

REFERENCES

[1]. Teaching cell division to secondary school students: An investigation of difficulties experienced by turkish teachers. (2003). *Journal of Biological Education*, 38(1), 13-15. doi:10.1080/00219266.2003.9655890.

[2]. Smith, M., & Ann C. H. Kindfield. (1999). Teaching Cell Division: Basics & Recommendations. *The American Biology Teacher,* 61(5), 366-371. doi:10.2307/4450699.

[3]. Keller, C. (2017). Using formative assessment to improve microscope skills among urban community college general biology I lab students. *Journal of College Science Teaching,* 46(3), 11-18.

[4]. Wigfield, A., & Eccles, J. S. (2000). Expectancy-Value theory of achievement motivation doi:10.1006/ceps.1999.1015

[5]. Dobbs, J., Krishnamurthy, S., Kyrish, M., Benveniste, A. P., Yang, W., & Richards-Kortum, R. (2015). Confocal fluorescence microscopy for rapid evaluation of invasive tumor cellularity of inflammatory breast carcinoma core needle biopsies. *Breast cancer research and treatment,* 149(1), 303-310.

[6]. Chen, B. C., Legant, W. R., Wang, K., Shao, L., Milkie, D. E., Davidson, M. W., . . . & English, B. P. (2014). Lattice light-sheet microscopy: imaging molecules to embryos at high spatiotemporal resolution. *Science,* 346 (6208), 1257998.

[7]. Cicchi, R., & Pavone, F. S. (2017). Probing Collagen Organization: Practical Guide for Second-Harmonic Generation (SHG) Imaging. In *Fibrosis* (pp. 409-425). Humana Press, New York, NY.

[8]. Ragan, T., Kadiri, L. R., Venkataraju, K. U., Bahlmann, K., Sutin, J., Taranda, J., . . . & Osten, P. (2012). Serial two-photon tomography for automated ex vivo mouse brain imaging. *Nature methods,* 9(3), 255-258.

[9]. Orringer, D. A., Pandian, B., Niknafs, Y. S., Hollon, T. C., Boyle, J., Lewis, S., . . . & Heth, J. A. (2017). Rapid intraoperative histology of unprocessed surgical specimens via fibre-laser-based stimulated Raman scattering microscopy. *Nature Biomedical Engineering,* 1, 0027.

[10]. Kawagoe, H., Yamanaka, M., Makita, S., Yasuno, Y., & Nishizawa, N. (2017, February). High-resolution and deep-tissue imaging with full-range, ultrahigh-resolution spectral-domain optical coherence tomography in 1.7 μm wavelength region (Conference Presentation). In *SPIE BiOS* (pp. 100531V-100531V). International Society for Optics and Photonics.

[11]. Farzad Fereidouni, Zachary T. Harmany, Miao Tian, Austin Todd, John A. Kintner, John D. McPherson, Alexander D. Borowsky, John Bishop, Mirna Lechpammer, Stavros G. Demos and Richard Levenson, "Microscopy with ultraviolet surface excitation for rapid slide-free histology", Nat. Biomed. Eng., in press

[12]. Oakley, J. (2012). Science teachers and the dissection debate: perspectives on animal dissection and alternatives. *International Journal of Environmental and Science Education,* 7(2), 253-267.

[13]. Hulleman, C. S., & Harackiewicz, J. M. (2009). Promoting interest and performance in high school science classes. 326(5958), 1410. doi:10.1126/science.1177067

[14]. Holstermann, N., Grube, D., & Bögeholz, S. (2010). Hands-on activities and their influence on students' interest. *Research in Science Education,* 40(5), 743-757.

[15]. Russell, W. M. S. and Burch, R. L., (1959). The Principles of Humane Experimental Technique, Methuen, London. ISBN 0900767782.

[16]. B. Lin, S. Urayama, R. M. G. Saroufeem, D. L. Matthews, S. G. Demos, "Real-time microscopic imaging of esophageal epithelial disease with autofluorescence under ultraviolet excitation", Optics Express 17, 12502-12509 (2009).

[17]. Rajesh N. Raman, Christopher D. Pivetti, Alexander M. Rubenchik, Dennis L. Matthews, Christoph Troppmann, and Stavros G. Demos, "Evaluation of the contribution of the renal capsule and cortex to kidney autofluorescence intensity under ultraviolet excitation", Journal Biomedical Optics 14, 020505-1 (2009).

The invention claimed is:

1. A method of imaging a stained sample using an ultraviolet surface excitation microscopy system, the method comprising:
   (a) using the ultraviolet surface excitation microscopy system to expose the stained sample to an ultraviolet light, wherein the stained sample is stained with a first fluorescing stain characterized by a first light emission spectrum when subjected to the ultraviolet light and a second fluorescing stain characterized by a second light emission spectrum when subjected to the ultraviolet light, wherein the first emission spectrum is different from the second emission spectrum; and
   (b) using the ultraviolet surface excitation microscopy system to capture an image of the stained sample exposed to the ultraviolet light;
   (c) digitally processing the captured image; and
   (d) displaying the digitally processed image, wherein the displayed image includes features associated with the first fluorescing stain displayed at a first intensity and features associated with the second fluorescing stain displayed at a second intensity, wherein the first and second intensities are approximately the same.

2. The method of claim 1 wherein digitally processing the captured image comprises applying different processes to different image components of the captured image.

3. The method of claim 1 wherein capturing the image of the stained sample comprises capturing a color-resolved image of the stained sample.

4. The method of claim 3 wherein digitally processing the captured image comprises: (i) separating the captured image components into separate color channels, and (ii) applying a different process to at least one of the separate color channels.

5. The method of claim 4 wherein digitally processing the captured image comprises, after applying the different process to at least one of the separate color channels, recombining the separate color channels to form the digitally processed image for display.

6. The method of claim 4 wherein applying the different process to at least one of the separate color channels comprises applying a different intensity modification to at least one of the separate color channels associated with the emission of one of the fluorescing stains.

7. The method of claim 1 wherein the first and second intensities being displayed in the digitally processed image are approximately the same comprises an average of the intensities of the light emissions of features associated with the first fluorescing stain as displayed by the system being within a range of ⅓ to 3 times an average of the intensities of the light emissions of features associated with the second fluorescing stain as displayed by the system.

8. The method of claim 7 wherein imaging the stained sample comprises using a multi-channel sensor to detect the light emissions collected by a microscope objective at different spectral ranges within the first and second light emission spectrums.

9. The method of claim 8 wherein a first channel of the multi-channel sensor is more sensitive to the first fluorescing stain light emission spectrum than the second fluorescing stain light emission spectrum, wherein a second channel of the multi-channel sensor is more sensitive to the second fluorescing stain light emission spectrum than the first fluorescing stain light emission spectrum.

10. The method of claim 8 wherein the microscopy system further comprises at least one optical filter configured to selectively attenuate at least a portion of at least one of the first and second light emission spectrums.

11. The method of claim 10 wherein the optical filter is located between the microscope objective and the multi-channel sensor.

12. The method of claim 10 wherein the at least one optical filter is configured to attenuate at least one of a red, green, or blue spectral range, wherein the multi-channel sensor has three channels covering red, green, or blue spectral ranges.

13. The method of claim 7 wherein exposing the stained sample to the ultraviolet light comprises using a 275 nm ultraviolet light source with a light density of 1 to 600 milliWatts per square centimeter.

14. The method of claim 7 wherein the ultraviolet light comprises an ultraviolet light having wavelength(s) in the range of 260 nm to 280 nm.

15. The method of claim 7 wherein the ultraviolet light comprises an ultraviolet light having wavelength(s) in the range of 230 nm to 370 nm.

16. The method of claim 14 wherein the ultraviolet light comprises an ultraviolet light having wavelength(s) in the range of 250 nm to 290 nm.

* * * * *